F. R. KEITH.
RUBBER HEEL AND METHOD OF MAKING THE SAME.
APPLICATION FILED DEC. 2, 1921.

1,426,198.

Patented Aug. 15, 1922.

Inventor.
Frederick R. Keith
by Heard Smith & Tennant.
Attys.

UNITED STATES PATENT OFFICE.

FREDERICK R. KEITH, OF RANDOLPH, MASSACHUSETTS.

RUBBER HEEL AND METHOD OF MAKING THE SAME.

1,426,198. Specification of Letters Patent. Patented Aug. 15, 1922.

Application filed December 2, 1921. Serial No. 519,320.

*To all whom it may concern:*

Be it known that I, FREDERICK R. KEITH, a citizen of the United States, and resident of Randolph, county of Norfolk, State of Massachusetts, have invented an Improvement in Rubber Heels and Methods of Making the Same, of which the following description, in connection with the accompanying drawing, is a specification, like characters on the drawing representing like parts.

This invention relates to rubber heels and has for its object to provide a novel rubber heel and a novel method by which the heel can be made.

The type of rubber heel to which the invention relates is one which has a reinforcing plate embedded therein for the purpose of giving the desired rigidity and resiliency to it.

In carrying out my invention I take a mass of rubber before it is cured and while it is in a relatively soft state and force by pressure a reinforcing plate into the mass of soft rubber, at the same time retaining the mass of rubber in the shape of a heel. After the reinforcing plate has thus been forced into the rubber mass by pressure and has become properly embedded therein then the rubber mass is vulcanized in the usual way thus completing the heel.

In order to give an understanding of my invention I have illustrated in the drawings and will now describe some embodiments thereof and one way in which the heel may be made.

In the drawings, Fig. 1 is a perspective view of a heel embodying my invention.

My improved heel comprises a heel body 1 of rubber or rubber compound which has embedded therein a reinforcing plate 2 that is preferably concavo-convex in shape with the convex side of the plate facing toward the wear surface of the heel. This reinforcing plate will preferably be made of metal and will be slightly resilient. It is of less transverse dimensions than the heel so that it does not extend clear to the periphery of the heel. It will preferably also have perforations 3 therein through which nails may be driven to attach the heel to the shoe. This plate constitutes an anchorage for the heads of the nails and thus takes the place of the usual metal washers which are embedded in the heel. It also acts to reinforce the heel throughout and because of its resilient character it adds to the resiliency of the heel.

Figure 1:
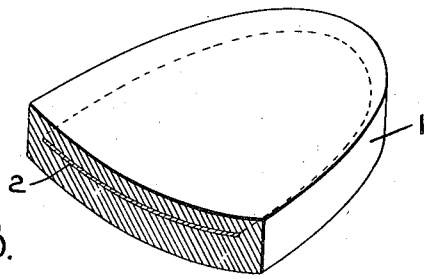
Figure 3:
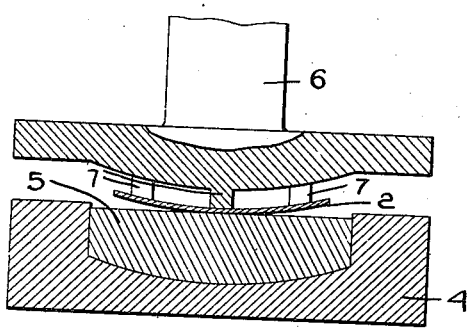
Figs. 3 and 4 are views showing the operation of forcing the reinforcing plate into the rubber mass forming the heel body.
Figure 4:
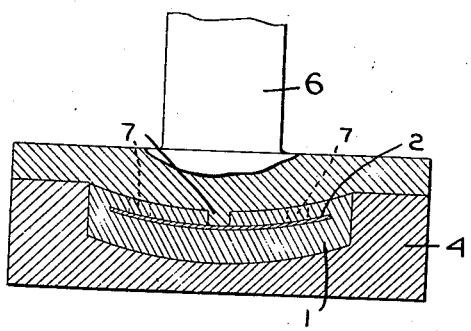

In making a rubber heel in accordance with my invention I take a mass 5 of rubber before it is vulcanized and while it is in a soft plastic condition and place this mass of rubber in a mold 4. The reinforcing plate is then forced into the mass 5 of rubber in a direction transverse to the general plane of the plate. This can be conveniently done by placing the plate on the rubber mass 5 in the mold as shown in Fig. 3 and then applying downward pressure on the plate. I have shown for this purpose a plunger 6 having feet or projections 7 extending therefrom and which engage the plate. By applying sufficient downward pressure to the plunger 6 the plate will be forced into the rubber mass 5 and because said mass is in a soft plastic condition and is confined within the mold 4 the rubber will flow around the plate 2 as shown in Fig. 4 so that the plate will become embedded in the rubber mass.

I may, if desired, employ a plate having perforations as shown at 10. After the plate has thus been forced into the rubber mass, as shown in Fig. 4, then the mold 4 is closed and the heel confined therein is subjected to the vulcanizing process thereby to vulcanize it.

If desired the plunger 6 may constitute the cap or closer for the mold, in which case it will have an under face of the shape desired for the attaching face of the heel, which as illustrated in the drawings is a convex face forming a convex or scoop-shaped attaching face for the heel. Or if desired a separate closer may be used to close the mold and give shape to the attaching face of the heel during the vulcanizing process.

Figure 2:
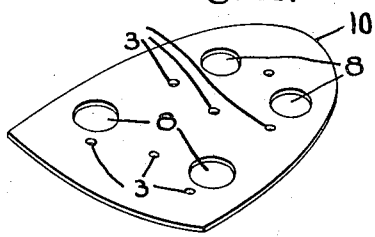
Fig. 2 is a view of the reinforcing plate.
Figure 5:
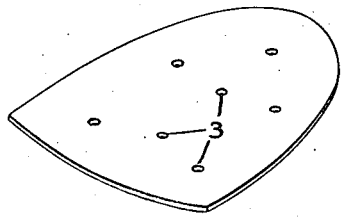
Fig. 5 is a view showing a different form of reinforcing plate from that shown in Fig. 2.

In the construction shown in Figs. 2 and 3 the reinforcing plate 2 is provided with perforations 8. I may, if desired, employ a reinforcing plate such as shown in Fig. 5, which is non-perforated except for the perforations constituting the nail hole. When this type of reinforcing plate is employed, the pressure of the plunger against the plate to force it into the rubber mass results in forcing some of the rubber around the edge of the plate, as shown in Fig. 5. In this case, I may, if desired, make a heel in which only the marginal portion of the plate is enclosed by the rubber, the central portion of the concave face of the plate being free from rubber. A heel having this construction will be provided with a concave attaching face, the marginal portions of which are rubber and the central portion of which is metal.

In attaching a rubber heel to a boot or shoe it is highly desirable that when the heel is secured to the shoe the marginal portion of the attaching face of the heel should fit tightly against the heel seat or heel base so as to make an inconspicuous joint.

The construction herein described insures that a desirable joint at this point will be formed because when the heel is nailed to the shoe the driving of the nails will flatten the plate thus causing the edges of the plate to bear firmly against the heel base or heel seat of the shoe and thus holding the marginal portion of the attaching face of the heel in firm contact with the heel base or heel seat portion. This structure thus prevents the rubber heel from separating from the heel base or heel seat portion. Where this plate is employed for this purpose it is possible to use softer rubber for the heel than when the heel is made without a reinforcing plate, for in the latter case the rubber of the heel has to be stiff enough to maintain the desirable contact of the marginal portion of the attaching face against the heel seat.

With this invention it is possible to use relatively soft rubber in the body of the heel because the metal plate maintains the desirable firm contact between the heel and the heel seat portion of the shoe. A relatively soft rubber has the advantage that it produces a more resilient heel than rubber which is relatively hard.

I claim.

1. The steps in the method of making a rubber heel which consists in forcing a reinforcing plate by pressure into a mass of soft rubber and retaining said mass of rubber in the shape of a heel during such operation, and then vulcanizing the heel with the plate embedded therein.

2. The method of making a rubber heel which consists in placing a mass of soft uncured rubber in a mold, pressing into said mass of rubber while in the mold a reinforcing plate which is of a less transverse dimension than the mold, and then vulcanizing the heel with the plate embedded therein.

3. A rubber heel having a reinforcing plate pressed into the rubber constituting the heel before it is vulcanized and while it is soft and plastic.

4. A rubber heel having a concavo-convex reinforcing plate pressed into the rubber constituting the heel before it is vulcanized and while it is soft and plastic.

In testimony whereof, I have signed my name to this specification.

FREDERICK R. KEITH.